US009117026B1

(12) United States Patent
Liu et al.

(10) Patent No.: US 9,117,026 B1
(45) Date of Patent: Aug. 25, 2015

(54) REPORTING THE PRESENCE OF HARDCODED STRINGS ON A USER INTERFACE (UI)

(71) Applicant: CA, Inc., Islandia, NY (US)

(72) Inventors: Yue Liu, Beijing (CN); Zaiwei Xiong, Beijing (CN); Jie Xu, Beijing (CN)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/139,529

(22) Filed: Dec. 23, 2013

(51) Int. Cl.
*G06F 9/44* (2006.01)
*G06F 11/36* (2006.01)

(52) U.S. Cl.
CPC ................... *G06F 11/3668* (2013.01)

(58) Field of Classification Search
USPC ................................................. 717/123–130
IPC .......... G06F 11/3668,11/3672, 11/368, 11/3692
See application file for complete search history.

(56) References Cited

U.S. PATENT DOCUMENTS

| 5,734,907 | A  | * | 3/1998 | Jarossay et al. | 717/141 |
|---|---|---|---|---|---|
| 6,763,517 | B2 | * | 7/2004 | Hines | 717/124 |
| 6,951,012 | B2 | * | 9/2005 | McGeorge, Jr. | 717/124 |
| 7,426,716 | B2 | * | 9/2008 | Kung et al. | 717/123 |
| 7,861,226 | B1 | * | 12/2010 | Episkopos et al. | 717/124 |
| 7,954,090 | B1 | * | 5/2011 | Qureshi et al. | 717/127 |
| 7,979,850 | B2 | * | 7/2011 | Ivanov et al. | 717/128 |
| 8,037,453 | B1 | * | 10/2011 | Zawadzki | 717/123 |
| 8,122,436 | B2 | * | 2/2012 | Costa et al. | 717/128 |
| 8,166,462 | B2 | * | 4/2012 | Kosche et al. | 717/130 |
| 8,359,582 | B2 | * | 1/2013 | Elliott | 717/130 |
| 8,370,812 | B2 | * | 2/2013 | Feblowitz et al. | 717/126 |
| 8,468,502 | B2 | * | 6/2013 | Lui et al. | 717/127 |
| 8,473,899 | B2 | * | 6/2013 | Centonze et al. | 717/108 |
| 8,499,286 | B2 | * | 7/2013 | Lawrance et al. | 717/124 |
| 8,510,709 | B2 | * | 8/2013 | Bordelon et al. | 717/109 |
| 8,627,287 | B2 | * | 1/2014 | Fanning et al. | 717/124 |
| 8,739,128 | B1 | * | 5/2014 | Cohen et al. | 717/124 |
| 8,893,087 | B2 | * | 11/2014 | Maddela | 717/124 |

OTHER PUBLICATIONS

Navarro "A Guided Tour to Approximate String Matching" ACM Computing Surveys, vol. 33, No. 1, pp. 31-88, 2001.*
Askitis et al, "B-tries for disk-based string management",The VLDB Journal, vol. 18, pp. 157-179, 2009.*
Ledru et al, "Using String Distances for Test Case Prioritisation" IEEE, pp. 510-514, 2009.*
Ngassam et al, "Taxonomy of DFA-Based String Processors", ACM, Proceedings of SAICSIT, pp. 238-246, 2006.*

* cited by examiner

*Primary Examiner* — Anil Khatri
(74) *Attorney, Agent, or Firm* — Coats & Bennett, PLLC

(57) ABSTRACT

A method and apparatus analyzes user interface (UI) screens associated with a software application, and determines whether any of the strings displayed on the UI screens are erroneously displayed to an end user. Based on the analysis, the method and apparatus generates a report for a developer or tester, for example, which allows that party to remove unwanted hardcoded strings from the UI screen code.

23 Claims, 7 Drawing Sheets

REPORTING THE PRESENCE OF HARDCODED STRINGS ON A USER INTERFACE (UI)

BACKGROUND

The present disclosure relates to computer-implemented methods for testing user applications, and more particularly to computer-implemented methods for locating and reporting the presence of hardcoded strings on an application's User Interface (UI) that is presented to an end user.

The process for developing software applications is generally referred to as a software development life-cycle. The fundamental goal of this process is to provide a reliable, repeatable, and predictable process that allows developers to create software applications with increased productivity and quality. Although different approaches for such processes exist, most, if not all, software development life-cycle approaches comprise the same general tasks or activities. These are the planning activities (e.g., requirements specification and software design), the implementation and testing activities (e.g., coding, testing, and documenting), and the deployment and maintenance activities (e.g., installation of the software, bug fixing, and maintaining/enhancing the software features).

There are many different tools and packages available to facilitate these activities. Some of the most useful tools are employed by personnel charged with validating the software applications during the implementation and testing activities phase of the software development life-cycle.

BRIEF SUMMARY

The present disclosure provides a method and apparatus for analyzing user interface (UI) screens associated with a software application, and for filtering or removing unwanted hardcoded strings from the UI screen code.

The method of the present disclosure is implemented on a computing device. Particularly, the device captures a screen image of a user interface being displayed to a user, and stores that captured image as a graphics file in a memory associated with the computing device. The device then extracts strings (e.g., hardcoded text) that are displayed on the user interface from the graphics file, and compares the extracted strings to a list of predefined strings stored in the memory. Based on the comparison, the device determines whether the string read from the user interface is being erroneously displayed on the user interface.

In one embodiment, for example, each string displayed on the user interface is compared to a list of predefined strings stored in the memory. By way of example only, correctly spelled labels that identify fields or user controls on the UI (e.g., "Username" or "Password"), or provide other information to a user are "valid" strings or "proper" strings, and therefore, would be found in the list of predefined strings. However, misspelled labels (e.g., "Logn"), or words and/or phrases that are erroneously displayed on the UI are "invalid" strings or "erroneous" strings and will not be found in the list of predefined strings.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
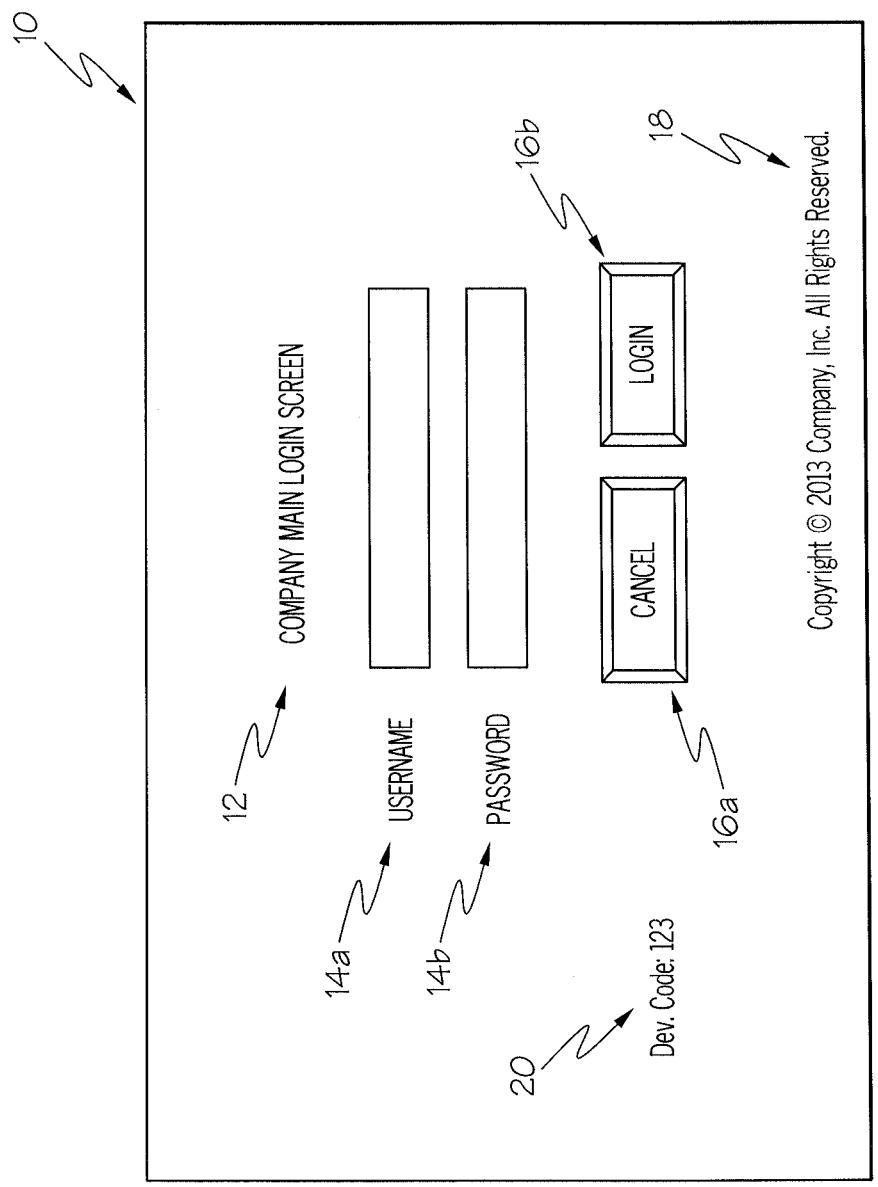
FIG. 1 is a perspective view of a main login screen seen on a display device according to one embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As part of the development and testing activities of the software application life-cycle, quality assurance (QA) and/or linguist testers typically review or validate user interface (UI) screens associated with a software application prior to the commercial release of the application. As many of the applications are released in different countries, the language on an application's UI screens reflects those corresponding different languages. Therefore, these testers, although they may test or validate functionality, tend to focus more on whether the strings displayed on the UI screens (e.g., labels that identify the "Username" and "Password" entry fields or that appear on or near user controls), are appropriate for the particular language.

Currently, the process for identifying and determining whether strings displayed on a given UI screen are appropriate for the particular language is performed manually. That is, testers invoke a given UI screen on a display, and then eyeball the strings on the UI screen to determine whether any problems exist, such as whether the strings on the UI screen are spelled correctly, whether they are in the correct language, or whether they are strings that are intended to be seen by the end user. Such manual approaches, however, are time consuming and highly unreliable. Thus, there is an increased risk that a defective UI screen is unintentionally included in a commercially released version of the software application and noticed by end users.

Accordingly, the present disclosure provides a method and apparatus for analyzing UI screens associated with a software application, and for filtering or removing unwanted hardcoded strings from the UI screen code. According to one or more embodiments, the method first determines whether any of the UI screens associated with a given software application comprise hardcoded alpha-numeric strings. If hardcoded strings are present in the UI, the method determines whether the strings are "valid" strings or "invalid" strings. "Valid" strings are hardcoded strings appearing on the UI that are properly displayed to an end user. Further, such strings are "valid" as long as they are spelled correctly and appear in the appropriate language. An example of such "valid" hardcoded strings are labels that identify the "Username" and "Password" entry fields on the UI, or labels appearing on or near buttons or other user controls. "Invalid" strings, however, comprise strings that are erroneously displayed to the user, such as misspelled strings, strings that appear in an incorrect language, or temporary strings that are not intended to be seen by an end user. For example, such temporary strings may comprise strings that are inserted into the UI code by a developer for unit testing purposes and then inadvertently forgotten by the developer. Based on this analysis of the UI, embodiments of the present disclosure generate a report, and in some cases, will alert predefined personnel to the report in accordance with predetermined criteria.

Turning now to the drawings, FIG. 1 is a perspective view illustrating a UI screen 10 being displayed on a display monitor to a user. As seen in FIG. 1, UI screen 10 is the type of screen typically referred to as a "Login" screen; however, those of ordinary skill in the art will readily appreciate that the present disclosure is not in any way limited only to such UI screens. Rather, the method of the present disclosure may be utilized to analyze any UI screen seen by an end user, and to generate a corresponding report identifying the occurrences of both valid and invalid strings on the UI screen.

As seen in FIG. 1, UI screen 10 comprises a plurality of strings comprised of one or more words. Some strings are "valid" strings, or properly displayed on the UI screen 10, while other strings are "invalid" strings or "erroneous" strings erroneously displayed on the UI screen 10.

Particularly, the UI screen 10 includes a title 12 (i.e., "COMPANY MAIN LOGIN SCREEN"), field labels 14a, 14b (i.e., "USERNAME" and "PASSWORD," collectively, 14) identifying their respective text entry fields, and button labels 16a, 16b (i.e., "CANCEL" and "LOGIN," collectively, 16) identifying their respective button controls. The UI screen 10 also comprises a copyright notice 18 that identifies the company and the copyright date of the UI screen 10. All of the words in the title 12, the field labels 14, the button labels 16, and the copyright notice 18, are spelled correctly, are intended to be seen by an end user on the UI screen 10, and are in the appropriate language, which in this embodiment is the English language. Therefore, these strings are considered "valid" or "proper" strings.

The other string that appears on the UI screen 10 is string 20. String 20, in this embodiment, comprises a hardcoded, alpha-numeric string that a developer may have temporarily inserted into the application code when creating the UI screen 10. At times, the developer may forget to remove the string from the code. Thus, such non-sensical strings may still appear on the UI screen 10 even though they are not intended to be seen by an end user. Such strings are referred to herein as "invalid" strings or "erroneous" strings.

Figure 2:
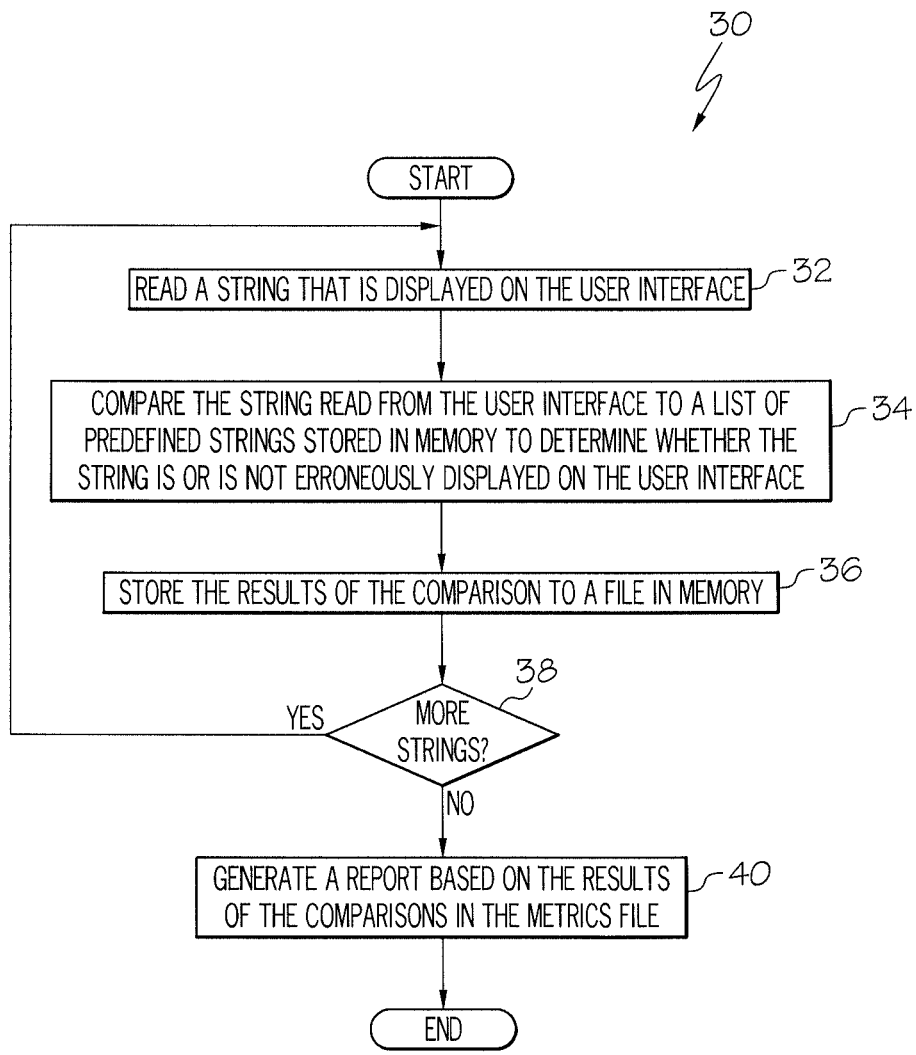
FIG. 2 is a flow diagram illustrating a method of analyzing a screen capture and reporting the results of that analysis to a user according to one embodiment of the present disclosure.

As stated above, embodiments of the present disclosure will analyze the UI screen 10 to identify each of these strings, and then generate a report to a user (e.g., a developer or tester) based on that analysis. FIG. 2 illustrates one such method 30 according to one embodiment. Particularly, method 30 begins with a user, such as a tester or developer, for example, invoking a control application that will read a string (e.g., title 12) displayed on UI screen 10 (box 32). As stated previously, the string may be read from a graphics file associated with the UI screen 10. Once read, the control application will compare the string to a list of known strings stored in memory for UI screen 10 (box 34). The list of known strings comprises a set of correctly spelled strings that are intended to be displayed on the UI screen 10 for that user application in the appropriate language. Thus, if a string is found in the list, the string is considered proper for the UI screen 10. If a string is not found in the list of known strings, however, the string is considered erroneous for the UI screen 10.

The control application then stores the results of the comparisons in a metrics file in memory (box 36) and repeats the process for each of the remaining strings (e.g., field labels 14, button labels 16, copyright notice 18, and string 20) (box 38). Once all the strings that appear on UI screen 10 have been read and compared to the list of known strings, the control application will generate a report based on the comparisons in the metrics file and output the report to the tester (box 40). In some situations, which are described later in more detail, the control application may also generate one or more alerts and send them to one or more other people or devices.

Figure 3A:
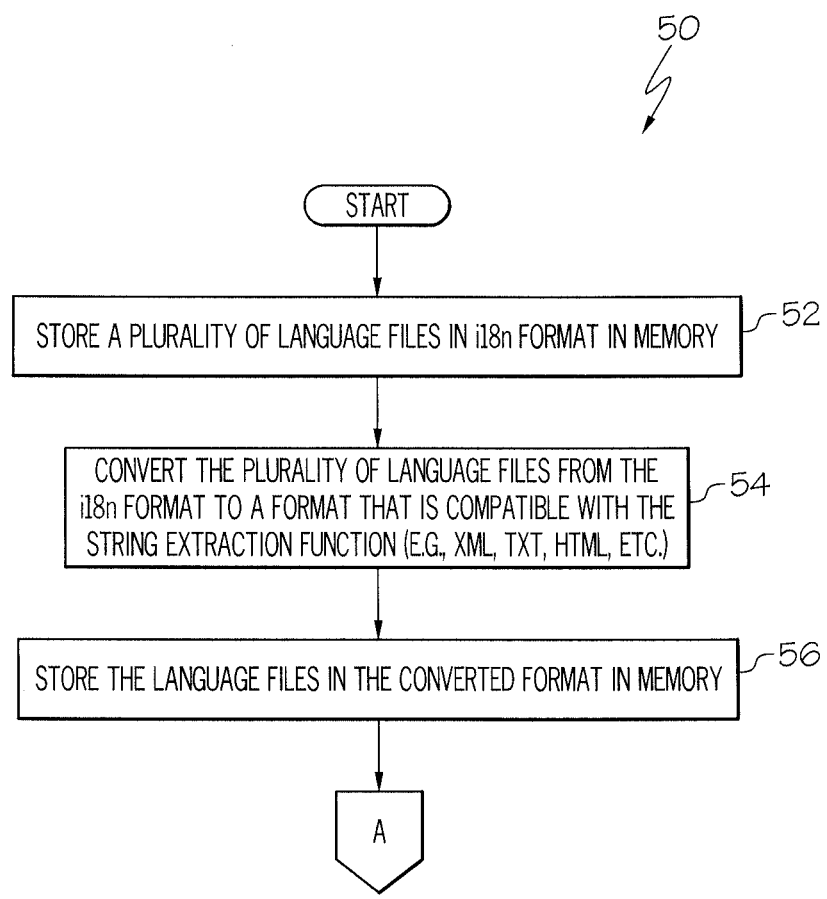
FIGS. 3A-3C are flow diagrams illustrating a method for analyzing a screen capture to determine whether a user input interface comprises hardcoded words or phrases according to one embodiment of the present disclosure.
Figure 3B:
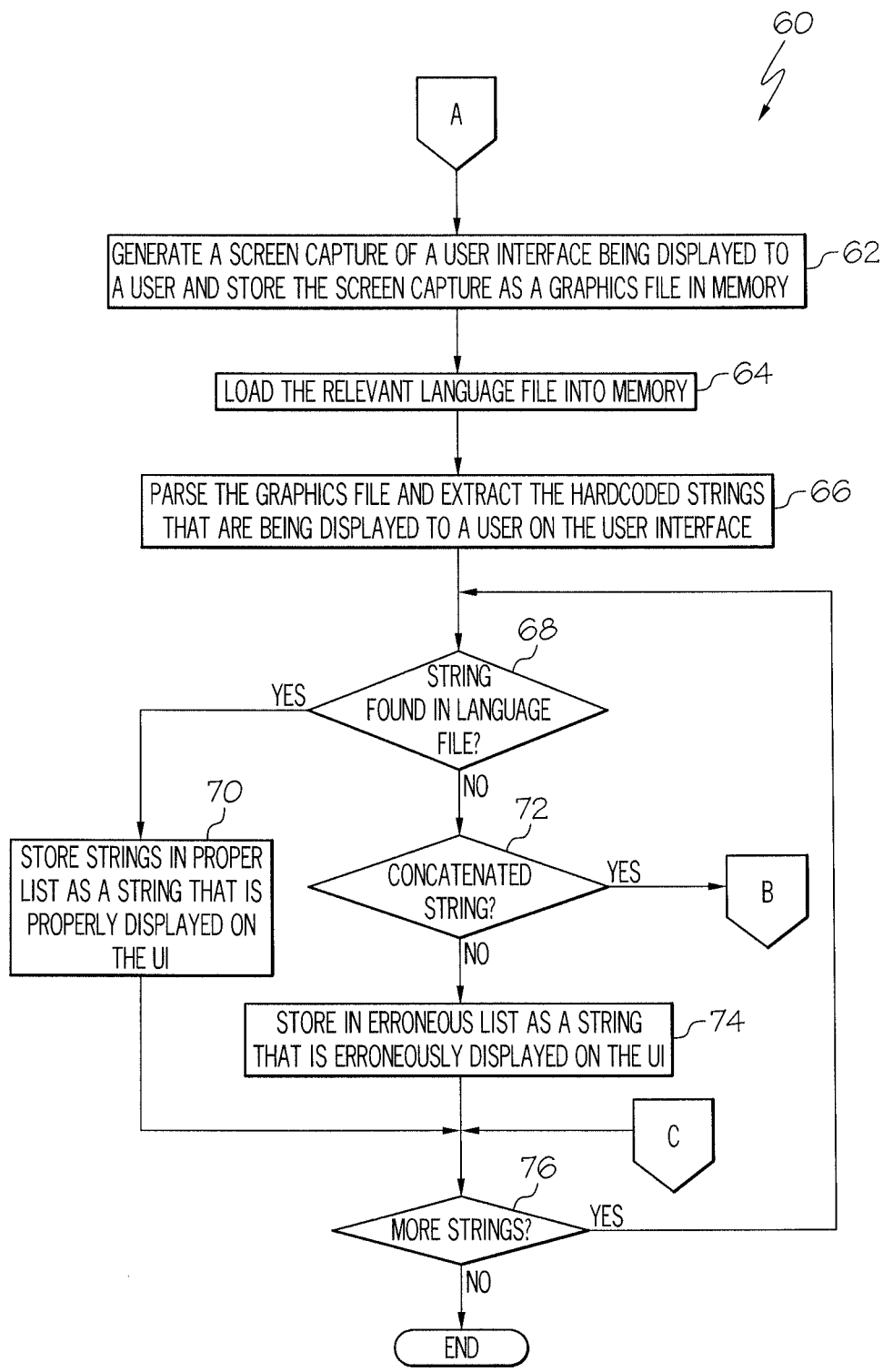
Figure 3C:
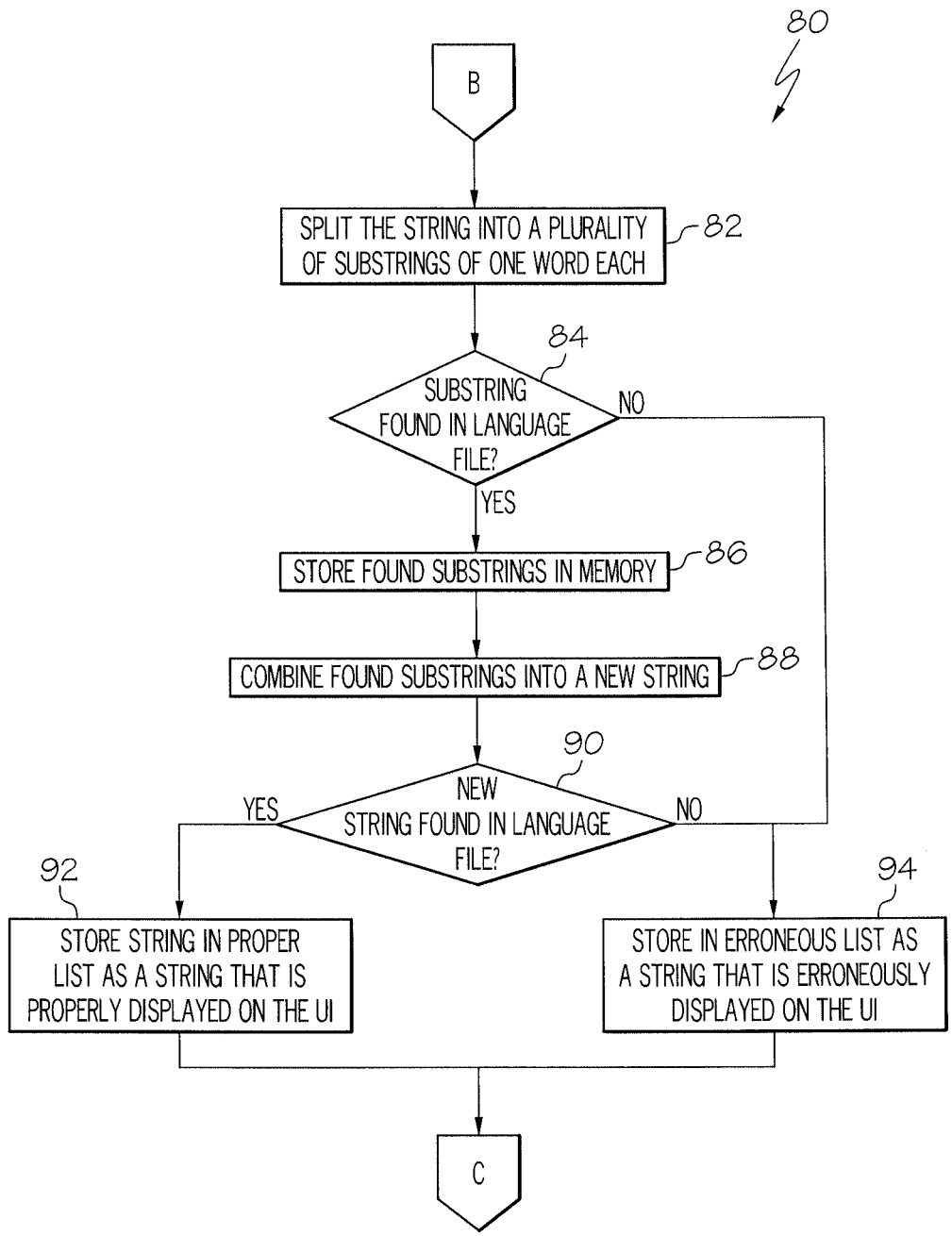

FIGS. 3A-3C illustrate the method of the present disclosure in more detail according to one embodiment. Particularly, method 50 of FIG. 3A is a flow diagram illustrating how the list of known strings is generated and processed for use in comparing the strings read from UI screen 10. More specifically, method 50 begins with storing a plurality of language files in memory in a first format (box 52). This first format may be any format needed or desired, but in one embodiment, comprises the well-known and well-understood "i18n" format. Particularly, i18n files are used extensively for adapting computer software to different languages and regions without requiring large-scale changes to the underlying application code. Such adaptations include, but are not limited to, language translation, cultural considerations, writing/reading conventions, aspects that help the software comply with local regulations, customs, symbols, and the like.

Once these i18n files are stored, embodiments of the present disclosure convert the i18n files into corresponding language files that are compatible with the function that will compare the strings read from UI screen 10 (box 54). By way of example only, such formats may comprise any well-known format such as the eXtended Markup Language (XML) format, the text (TXT) format, the HyperText Markup Language (HTML) format, and the like. Thus, if the control application reads strings from the graphics file in a TXT format, the control application will compare those strings to the strings in the converted language file, which are also in the TXT format. The converted language files are then stored in memory (box 56).

FIGS. 3B-3C illustrate a method 60 in which the control application analyzes the strings on UI screen 10 according to one embodiment. As seen in FIG. 3B, the control application first generates a screen capture of UI screen 10 as it is displayed on a display monitor, and stores that screen capture in memory as a graphics file (box 62). A screen capture, also known as a "screen dump," "screen image," or "screenshot," is a digital image generated by a computer of whatever is being displayed on the display monitor associated with the computer.

There are many different third-party user applications that may be invoked to capture the screen image, such as "X-GRAB" or "SCREEN GRAB," for example. Typically, such applications capture the image of whatever is being displayed on the display monitor and store it in memory. Alternatively, however, the operating system on the computer may be configured to capture the image on the display screen. In these situations, the tester may simply press a predetermined sequence of keys on the keyboard to capture the screen image and store it to memory.

Once the screen capture is stored, the tester can load the relevant converted language file into memory (box 64). Once loaded, the control application can parse the graphics file associated with the screen capture to extract the strings that are being displayed on the UI screen 10 (box 66). In one embodiment, for example, the strings comprise hardcoded strings, and the control application invokes the well-known "gettext" utility. The "gettext" utility is a JAVA-based software program that identifies strings within a file, and extracts or reads those strings. However, as those of ordinary skill in the art will appreciate, any utility or method for extracting such strings from the graphics file is possible.

Once the string has been extracted, the control application will compare the extracted string to the list of strings in the converted language file (box 68). If the string matches a string in the list, the control application stores the string in a "proper" list as being a string that is properly displayed on the UI (box 70). In some embodiments, the control application may update or initiate certain other metrics, such as incrementing a counter, for example, for each string found. The method then determines whether there are additional strings (box 76) and if so, repeats the comparison process (box 68) for that string.

If the control application receives a "no match" condition, meaning that the converted language file does not include the extracted string (box 68), the control application will then test the string to determine whether the string comprises a single word, or is a concatenated string comprising a plurality of words and/or numbers connected together, such as a sentence (box 72). If the string is comprises a single word, then the string is not included in the converted language file. Thus, method 60 determines that the string is erroneously displayed on the UI, and stores the string in an "erroneous" list. Additionally, as above, the control application may also store and/or update other metrics regarding the extracted string.

If the control application determines that the string is a concatenated string, however (box 72), the control application will perform additional processing (see method 80 in FIG. 3C). Particularly, the control application will split or partition the concatenated string into a plurality of substrings of one word each (box 82). The control application will then compare each of the single-word substrings to the list of known strings in the converted language file (box 84). Those substrings that are not found in the list are added to the erroneous list as strings that are erroneously displayed on the UI (box 94). Those that are found in the list, however, are temporarily stored in memory to a "temp list" (box 86). The control application then combines the substrings that in the temp list to form a new string (box 88) and compares the new string to the list of predefined strings in the converted language file (box 90). As above, if the new string is found in the list, the new string is added to the proper list as a string that is properly displayed on the UI (box 92). Otherwise, if the new string is not found in the list, the new string is added to the erroneous list as a string that is erroneously displayed on the UI (box 94). Other metrics may also be updated, and processing returns to FIG. 3B, where it is determined whether more strings are to be processed (box 76). If so, processing continues until all strings have been processed.

Figure 4:
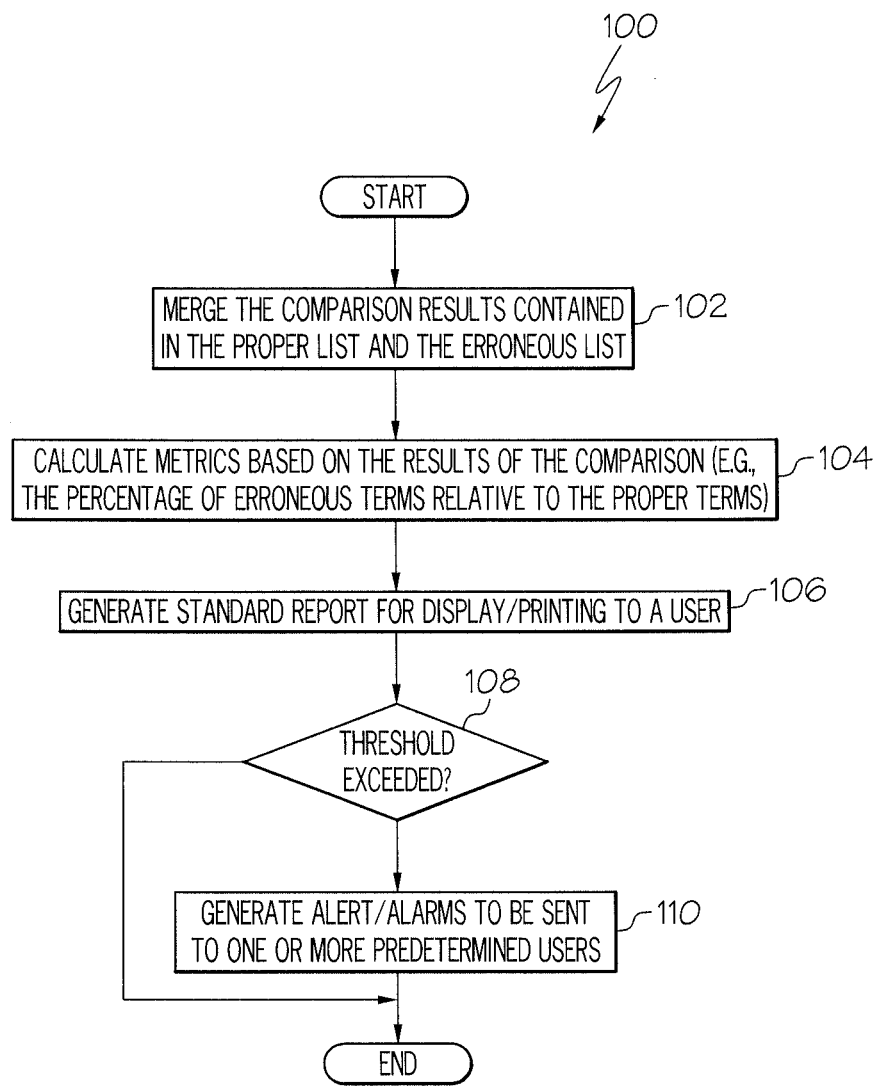
FIG. 4 is a flow diagram illustrating a method for generating a report based on the analysis according to one embodiment of the present disclosure.

FIG. 4 is a flow diagram illustrating a method 100 for generating a report from the information stored in the proper and erroneous lists (i.e., those strings found in the converted language file, and those strings that are not found in the converted language file). Method 100 begins with the control application merging the comparison results contained in the two lists (box 102). Once merged, the control application calculates metrics based on the results of the comparisons (box 104). Those skilled in the art will readily appreciate that any metrics needed or desired may be calculated, however, in one embodiment, the control application calculates the percentage of "erroneous" hardcoded strings that are erroneously displayed on the UI to "proper" strings that are properly displayed on the UI. The control application then generates a standard report identifying the proper and erroneous strings for presentation to the user.

For example, the report may be displayed to the tester or other user on the display monitor, or may be sent to a printer, and may comprise information such as the identity of the particular strings as well as the identity of the UI screen 10 on which they are displayed. Such information may assist a developer or other user in locating the particular string and correcting a problem. Particularly, a developer may need to remove the string 20 or correct a misspelled word or phrase in one or more of the title 12, the field labels 14, the button labels 16, and the copyright notice 18.

In one embodiment, the control application may also generate an alert for certain predefined personnel. Particularly, the control application may determine whether the calculated percentage of erroneous words exceeds a predetermined threshold (box 108). If not, processing ends. If the percentage does exceed the threshold, however, the control application can generate an alert or other alarm to send to the predefined user (box 110). Such alerts/alarms may comprise, for example, email or text notifications to the predefined users. So informed, the users could access the report and fix or otherwise address any issues uncovered by the control application with respect to uncovered strings that are in the UI screen 10.

Figure 5:
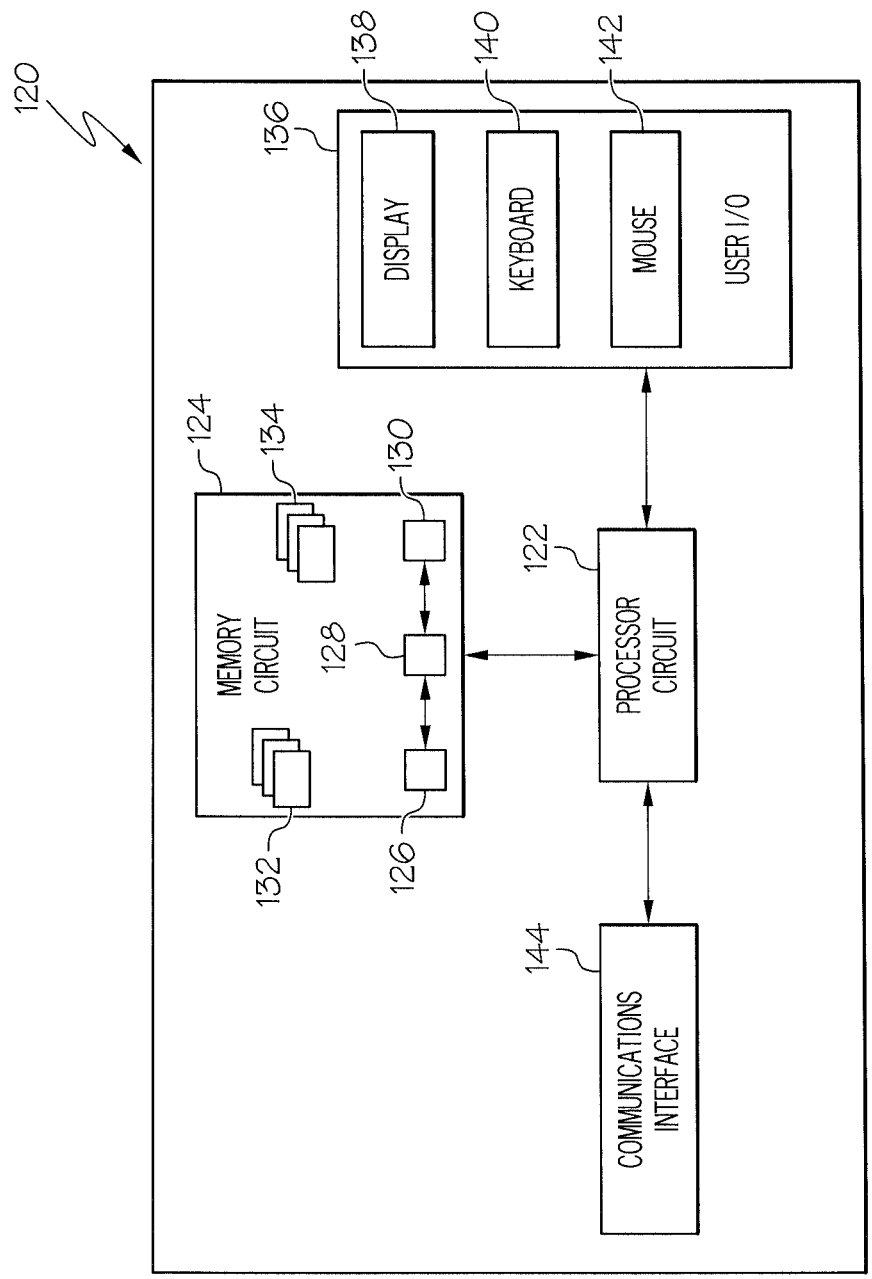
FIG. 5 is a block diagram illustrating some of the components of a computing device configured to perform a method of the present disclosure according to one embodiment.

FIG. 5 is a block diagram illustrating some of the components in a computing device 120 that is configured to function according to one or more embodiments of the present disclosure. As seen in FIG. 5, the computing device 120 comprises a programmable controller 122, a memory circuit 124, a user interface 136, and a communications interface 144. Those of ordinary skill in the art will appreciate that the illustrated components are not the only components of computing device 120, and that other components may also be included as needed or desired.

The programmable controller 122 may be implemented by one or more microprocessors, hardware, firmware, or a combination thereof, and generally controls the operation and functions of the computing device 120. Such operations and functions include, but are not limited to, capturing images of UI screen 10 as displayed on the UI 136, storing the screen capture as a graphics file in the memory circuit 124, analyzing the graphics file to determine whether any of the strings displayed on UI screen 10 are erroneously displayed on the UI screen 10, and generating a report to a user based on the analysis according to the embodiments as previously described. Further, in at least one embodiment, the programmable controller 122 will selectively generate and send alerts or alarms to one or more predefined users to inform those users of the results of the analysis, as previously described.

Additionally, the programmable controller 122 accepts user input from the keypad 140 of user interface 24, as well as from other user input devices such as mouse 142, and displays UI screens associated with a user application that is executing on device 120 on display 138. Therefore, according to one or more embodiments, the programmable controller 122 may receive one or more commands from a user, and in response, perform the method previously described.

The memory circuit 124, or simply "memory" 124, may comprise any non-transitory, solid state memory or computer readable media known in the art. Suitable examples of such media include, but are not limited to, Read Only Memory (ROM), Dynamic Random Access Memory (DRAM), Flash, or a device capable of reading computer-readable media, such as optical or magnetic media. The memory 124 stores programs and instructions, such as control application 126 and the proper and erroneous lists 128, 130, respectively, that store the metrics of the comparison results, as well as the language files in the previously identified i18n format, as well as the language files 134 that are converted from that i18n format. As previously described, the converted language files 134 are used by the control application 126 to compare the strings read from the UI screen 10 to determine whether those strings are valid or invalid. The control application 126, when executed by programmable controller 122, controls the programmable controller 122 to perform these functions as well as the other functions previously described.

The communications interface 144 comprises a transceiver or other communications interface known in the art that facilitates the communications with remote devices such as application servers and user devices. Such an interface may comprise, for example, an ETHERNET component capable of communicating data and information over a communications network as is known in the art.

In one aspect, the programmable controller 122, in accordance with the instructions in the control application 126, determines whether the results of a given analysis of UI screen 10 warrants notifying a user, such as a developer or other interested party, via an alarm or alert. If so, the programmable controller 122 generates the alert (e.g., a text message or email message), and sends the alert to a device associated with the identified user via the communications interface 144. The particular parties that are to receive the alerts, as well as the identities of their respective devices, are stored in one or more profiles in the memory 124.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
    capturing a screen image of a user interface being displayed to a user, wherein the user interface comprises a string;
    storing the screen image as a graphics file in a memory;
    extracting the string from the graphics file;
    comparing the string extracted from the graphics file to a list of predefined strings stored in the memory; and
    determining whether the string is erroneously displayed on the user interface based on the comparison, determining whether the string is erroneously displayed on the user interface comprises:
    storing the string to a list of proper strings if the string is found in the list of predefined strings; and storing the string to a list of erroneous strings if the string is not found in the list of predefined strings.

2. The computer-implemented method of claim 1 further comprising:
    updating metrics stored in the memory based on the comparison, wherein the metrics indicate whether the string is erroneously displayed on the user interface, or properly displayed on the user interface; and
    generating a report from the metrics indicating the occurrence of strings that are properly displayed on the user interface and that are erroneously displayed on the user interface.

3. The computer-implemented method of claim 1 further comprising:
    storing a plurality of language files in the memory, each language file comprising the list of predefined strings in a corresponding language; and
    converting the plurality of language files from a first format in which the list of predefined strings is not compatible for the comparison, to a second format in which the list of predefined strings is compatible for the comparison.

4. The computer-implemented method of claim 1 further comprising determining whether the string comprises a concatenated string if the string is erroneously displayed on the user interface.

5. The computer-implemented method of claim 4 wherein if the string comprises a concatenated string, the method further comprises:
    partitioning the string into a plurality of substrings, each substring comprising a single term;
    comparing each substring to the list of predefined strings; and
    storing each substring that is not found in the list of predefined strings to the list of erroneous strings.

6. The computer-implemented method of claim 5 further comprising:
    combining each substring that is found in the list of predefined strings into a combined string;
    comparing the combined string to the list of predefined strings; storing the combined string to the list of proper strings if the combined string is found in the list of predefined strings; and
    storing the combined string to the list of erroneous strings if the combined string is not found in the list of predefined strings.

7. The computer-implemented method of claim 2 wherein updating metrics stored in the memory based on the comparison comprises:
    storing the string to the list of proper strings if the string is found in the list of predefined strings; and
    storing the string to the list of erroneous strings if the string is not found in the list of predefined strings.

8. The computer-implemented method of claim 7 wherein generating a report from the metrics indicating the occurrence of strings that are properly displayed on the user interface and that are erroneously displayed on the user interface comprises:
    computing a percentage value defining a number of strings in the list of erroneous strings relative to a number of strings in the list of proper strings;
    outputting the report if the percentage value exceeds a predetermined threshold value.

9. A computer device comprising:
    a display configured to display a user interface to a user;
    a memory circuit configured to:
    store a screen image of the user interface as a graphics file, wherein the user interface comprises a string; and
    store a list of predefined strings that are valid for display on the user interface; and a processing circuit configured to:
capture the screen image of the user interface being displayed to a user;
extract the string from the graphics file;
compare the string stored in the graphics file to the list of predefined strings;
determine whether the string is an erroneous string that is erroneously displayed on the user interface based on the comparison;
store the string to a list of proper strings if the string is found in the list of predefined strings; and
store the string to a list of erroneous strings if the string is not found in the list of predefined strings.

10. The computer device of claim 9 wherein the memory circuit is further configured to store metrics indicating whether the string is erroneously displayed on the user interface or is properly displayed on the user interface, and wherein the processing circuit is further configured to:
update the metrics based on the comparison; and
generate a report from the metrics indicating the occurrence of strings that are properly displayed on the user interface, and that are erroneously displayed on the user interface.

11. The computer device of claim 10 wherein to update the metrics stored in the memory based on the comparison, the processing circuit is further configured to:
store the string to the list of proper strings if the string is found in the list of predefined strings; and
store the string to the list of erroneous strings if the string is not found in the list of predefined strings.

12. The computer device of claim 11 wherein to generate a report from the metrics indicating the occurrence of strings that are properly displayed on the user interface, and that are erroneously displayed on the user interface, the processing circuit is further configured to:
compute a percentage value defining a number of strings in the list of erroneous strings relative to a number of strings in the list of proper strings;
output the report if the percentage value exceeds a predetermined threshold value.

13. The computer device of claim 9 wherein the memory circuit is further configured to store a plurality of language files, each language file comprising the list of predefined strings in a corresponding language, and wherein the processing circuit is further configured to:
convert the plurality of language files from a first format in which the list of predefined strings is not compatible for the comparison, to a second format in which the list of predefined strings is compatible for the comparison.

14. The computer device of claim 9 wherein if the string is erroneously displayed on the user interface, the processing circuit is further configured to determine whether the string comprises a concatenated string.

15. The computer device of claim 14 wherein if the string comprises a concatenated string, the processing circuit is further configured to:
partition the string into a plurality of substrings, each substring comprising a single term;
compare each substring to the list of predefined strings; and
store each substring that is not found in the list of predefined strings to the list of erroneous strings.

16. The computer device of claim 15 wherein the processing circuit is further configured to:
combine each substring that is found in the list of predefined strings into a combined string;
compare the combined string to the list of predefined strings;
store the combined string to the list of proper strings if the combined string is found in the list of predefined strings; and
store the combined string to the list of erroneous strings if the combined string is not found in the list of predefined strings.

17. A computer program product comprising:
a non-transitory computer readable medium configured to store a control application that, when executed on by a processing circuit of a computing device, configures the processing circuit to:
capture a screen image of a user interface being displayed to a user, wherein the user interface comprises a string;
store the screen image as a graphics file in a memory;
extract the string from the graphics file;
compare the string stored in the graphics file to a list of predefined strings stored in the memory;
determine whether the string is an erroneous string erroneously displayed on the user interface based on the comparison;
store the string to a list of proper strings if the string is found in the list of predefined strings; and
store the string to a list of erroneous strings if the string is not found in the list of predefined strings.

18. The computer program product of claim 17 wherein the control application further configures the processing circuit to:
update metrics stored in the memory based on the comparison, wherein the metrics indicate whether the string is erroneously displayed on the user interface, or is properly displayed on the user interface; and
generate a report from the metrics indicating the occurrence of strings that are properly displayed on the user interface, and of strings that are erroneously displayed on the user interface.

19. The computer program product of claim 17 wherein the control application further configures the processing circuit to:
store a plurality of language files in the memory, each language file comprising the list of predefined strings in a corresponding language; and
convert the plurality of language files from a first format in which the list of predefined strings is not compatible for the comparison, to a second format in which the list of predefined strings is compatible for the comparison.

20. The computer program product of claim 17 wherein if the string is erroneously displayed on the user interface, the control application further configures the processing circuit to determine whether the string comprises a concatenated string.

21. The computer program product of claim 20 wherein if the string comprises a concatenated string, the control application further configures the processing circuit to:
partition the string into a plurality of substrings, each substring comprising a single term;
compare each substring to the list of predefined strings; and
store each substring that is not found in the list of predefined strings to the list of erroneous strings.

22. The computer program product of claim 20 wherein the control application further configures the processing circuit to:
combine each substring that is found in the list of predefined strings into a combined string;
compare the combined string to the list of predefined strings;

store the combined string to the list of proper strings if the combined string is found in the list of predefined strings; and store the combined string to the list of erroneous strings if the combined string is not found in the list of predefined strings.

23. The computer program product of claim 20 wherein the control application further configures the processing circuit to:

compute a percentage value defining a number of strings in the list of erroneous strings relative to a number of strings in the list of proper strings; and output the report if the percentage value exceeds a predetermined threshold value.

* * * * *